US010955335B2

(12) United States Patent
Pelivanov et al.

(10) Patent No.: US 10,955,335 B2
(45) Date of Patent: Mar. 23, 2021

(54) NON-CONTACT PHOTOACOUSTIC SPECTROPHOTOMETRY INSENSITIVE TO LIGHT SCATTERING

(71) Applicant: University of Washington, Seattle, WA (US)

(72) Inventors: Ivan Pelivanov, Seattle, WA (US);
Matthew O'Donnell, Seattle, WA (US);
Elena Petrova, Seattle, WA (US); Soon Joon Yoon, Seattle, WA (US)

(73) Assignee: University of Washington, Seattle, WA (US)

( * ) Notice: Subject to any disclaimer, the term of this patent is extended or adjusted under 35 U.S.C. 154(b) by 90 days.

(21) Appl. No.: 16/368,668

(22) Filed: Mar. 28, 2019

(65) Prior Publication Data
US 2019/0302007 A1    Oct. 3, 2019

Related U.S. Application Data

(60) Provisional application No. 62/649,142, filed on Mar. 28, 2018.

(51) Int. Cl.
*G01N 21/17*    (2006.01)
*G01N 21/25*    (2006.01)

(52) U.S. Cl.
CPC ....... *G01N 21/1702* (2013.01); *G01N 21/255* (2013.01); *G01N 2201/06113* (2013.01); *G01N 2201/088* (2013.01)

(58) Field of Classification Search
CPC ............. G01N 21/1702; G01N 21/255; G01N 2201/06113; G01N 2201/088
See application file for complete search history.

(56) References Cited

U.S. PATENT DOCUMENTS

| 5,483,340 A | 1/1996 | Webb et al. |
| 5,824,908 A | 10/1998 | Schindel et al. |

(Continued)

OTHER PUBLICATIONS

Allen, D., et al., "Spectrophotometry," Oct. 5, 2010, <http://www.nist.gov/pml/div685/grp03/spectrophotometry.cfm> [retrieved Sep. 16, 2019], 4 pages.

(Continued)

*Primary Examiner* — Michael A Lyons
(74) *Attorney, Agent, or Firm* — Christensen O'Connor Johnson Kindness, PLLC

(57) ABSTRACT

A non-contact photoacoustic spectrophotometry system is configured to measure an absorption spectrum of a material. The system includes a modulated light source such as tunable pulsed laser that generates laser pulses to produce photoacoustic signals in the material. A non-contact detector monitors the surface of the container for the material. The detector includes a second light source, such as a continuous wave laser, focused on the surface of the container, and transmits reflected light to an interferometer, for example, a Sagnac interferometer. The interferometer produces an interference signal from the received light that is proportional to the acoustic pressure, which is transmitted to a computer to calculate an absorption coefficient. Using a plurality of wavelengths from the tunable pulsed laser, an absorption spectrum may be generated.

20 Claims, 3 Drawing Sheets

(56) References Cited

U.S. PATENT DOCUMENTS

| | | | | |
|---|---|---|---|---|
| 5,894,531 | A | * | 4/1999 | Alcoz .................. G01H 9/004 250/227.27 |
| 6,552,799 | B1 | | 4/2003 | Wright et al. |
| 6,812,045 | B1 | | 11/2004 | Nikoonahad et al. |
| 6,921,366 | B2 | | 7/2005 | Jeon et al. |
| 8,454,512 | B2 | | 6/2013 | Wang et al. |
| 9,219,507 | B2 | | 12/2015 | Rofougaran et al. |
| 9,791,419 | B2 | | 10/2017 | Prinzhorn et al. |
| 9,835,552 | B2 | * | 12/2017 | Wagner ............... G01N 15/147 |
| 2005/0070803 | A1 | | 3/2005 | Cullum et al. |
| 2005/0090019 | A1 | * | 4/2005 | Wendelbo ........... B01L 3/50255 436/180 |
| 2006/0215175 | A1 | * | 9/2006 | Yacoubian ......... G01N 21/9505 356/502 |
| 2009/0002685 | A1 | | 1/2009 | Fukutani et al. |
| 2009/0054763 | A1 | | 2/2009 | Wang et al. |
| 2012/0220844 | A1 | | 8/2012 | Baker, Jr. |
| 2014/0014841 | A1 | * | 1/2014 | Hsu ...................... G01N 21/171 250/339.12 |
| 2015/0223681 | A1 | * | 8/2015 | Kuranov .............. A61B 5/4238 600/425 |
| 2016/0113507 | A1 | * | 4/2016 | Reza .................. G01N 21/1702 356/477 |
| 2017/0115110 | A1 | | 4/2017 | Pelivanov et al. |
| 2018/0360377 | A1 | | 12/2018 | Ulman et al. |

OTHER PUBLICATIONS

Atwater, H.A., and A. Polman, "Plasmonics for Improved Photovoltaic Devices," Nature Materials 9:205-213, 2010.
Burda, C., et al., "Chemistry and Properties of Nanocrystals of Different Shapes," Chemical Reviews 105:1025-1102, 2005.
Butler, W.L., and K.H. Norris, "The Spectrophotometry of Dense Light-Scattering Material," Archives of Biochemistry and Biophotonics 87:31-40, 1960.
Chen, S.-L., et al., "All-Optical Photoacoustic Microscopy," Photoacoustics 3:143-150, 2015.
Chen, Y.-S., et al., "Enhanced Thermal Stability of Silica-Coated Gold Nanorods for Photoacoustic Imaging and Image-Guided Therapy," Optics Express 18:8867-8878, 2010.
Chen, Y.-S., et al., "Environment-Dependent Generation of Photoacoustic Waves From Plasmonic Nanoparticles," Small 8:47-52, 2012.
Cheng, Y.C., et al., "Highly Efficient Drug Delivery With Gold Nanoparticle Vectors for In Vivo Photodynamic Therapy of Cancer," Journal of the American Chemical Society 130:10643-10647, 2008.
Daniel, M.C. and D. Astruc, "Gold Nanoparticles: Assembly, Supramolecular Chemistry, Quantum-Size-Related Properties, and Applications Toward Biology, Catalysis, and Nanotechnology," Chemical Reviews 104:293-346, 2004.
El-Ansary A., and L.M. Faddah, "Nanoparticles as Biochemical Sensors," Nanotechnology, Science and Applications 3:65-76, 2010.
El-Sayed, M.A., "Some Interesting Properties of Metal Confined in Time and Nanometer Space of Different Shapes," Accounts of Chemical Research 34:257-264, 2001.
Emerich, D.F., and C.G. Thanos, "The Pinpoint Promise of Nanoparticle-Based Drug Delivery and Molecular Diagnosis," Biomolecular Engineering 23:171-184, 2006.
Filimonova, T.A., et al., "Optoacoustic Spectroscopy for Real-Time Monitoring of Strongly Light-Absorbing Solutions in Applications to Analytical Chemistry," Photoacoustics 1:54-61, 2013.
Fonseca, M., et al., "Characterisation of a Phantom for Multiwavelength Quantitative Photoacoustic Imaging," Physics in Medicine and Biology 10(61):4950-4973, 2016.
Funston, A.M., et al., "Plasmon Coupling of Gold Nanorods at Short Distances and in Different Geometries," Nano Letters 9:1651-1658, 2009.
Gaigalas, A.K., et al., "Measurement of Absorption and Scattering With an Integrating Sphere Detector: Application to Microalgae," Journal of Research of the National Institute of Standards and Technology 114(2):69-81, Mar.-Apr. 2009.
Gellner, M., et al., "Optical Properties and SERS Efficiency of Tunable Gold/Silver Nanoshells," Vibrational Spectroscopy 50:43-47, 2009.
Giljohann, D., and C.A. Mirkin, "Drivers of Biodiagnostic Development," Nature 462:461-464, Nov. 2009.
Grashin, P.S., et al., "Distribution of the Laser Radiation Intensity in Turbid Media: Monte Carlo Simulations, Theoretical Analysis and the Results of Optoacoustic Measurements," Quantum Electronics 32(10):868-874, 2002.
Grashin, P.S., et al., "Laser Fluence Rate Distribution Beneath the Surface of Turbid Media: Comparison of the Time-Resolved Optoacoustic Measurements, the Monte-Carlo Simulation and the Theoretical Approach," Asian Journal of Physics 10(4):469-479, 2001.
Haes, A.J., and R.P. Van Duyne, "A Nanoscale Optical Biosensor: Sensitivity and Selectivity of an Approach Based on the Localized Surface Plasmon Resonance Spectroscopy of Triangular Silver Nanoparticles," Journal of the American Chemical Society 124:10596-10604, 2002.
Hirsch, L.R., et al., "Metal Nanoshells," Annals of Biomedical Engineering 34(1):15-22, Jan. 2006.
Hou, S., et al., "Nanomaterials for Biosensing Applications," Nanomaterials 6(4):58, Apr. 2016, 4 pages.
Hu, M., et al., "Gold Nanostructures: Engineering Their Plasmonic Properties for Biomedical Applications," Chemical Society Reviews 35:1084-1094, 2006.
Huang, X., and M.A. El-Sayed, "Plasmonic Photo-Thermal Therapy (PPTT)," Alexandria Journal of Medicine 47:1-9, 2011.
Huang, X., et al., "Cancer Cell Imaging and Photothermal Therapy in the Near-Infrared Region by Using Gold Nanorods," Journal of the American Chemical Society 128:2115-2120, 2006.
Inkov, V.N., et al., "A Theoretical Model of the Linear Thermo-Optical Response of an Absorbing Particle Immersed in a Liquid," Laser Physics 11(12):1283-1291, 2001.
Jacques, S.L., "Optical Properties of Biological Tissues: A Review," Physics in Medicine and Biology 58:R37-R61, 2013.
Jain, P.K., et al., "Calculated Absorption and Scattering Properties of Gold Nanoparticles of Different Size, Shape and Composition: Applications in Biological Imaging and Biomedicine," Journal of Physical Chemistry B 110:7238-7248, 2006.
Jain, P.K., et al., "Noble Metals on the Nanoscale: Optical and Photothermal Properties and Some Applications in Imaging, Sensing, Biology, and Medicine," Accounts of Chemical Research 41(12):1578-1586, 2008.
Jain, P.K., et al., "Plasmon Coupling in Nanorod Assemblies: Optical Absorption, Discrete Dipole Approximation Simulation, and Exciton-Coupling Model," Journal of Physical Chemistry B 110:18243-18253, 2006.
Johnson, P.B., and R.W. Christy, "Optical Constants of the Noble Metals," Physical Review B 6:4370-4379, Dec. 1972.
Jokerst, J.V., et al., "Photoacoustic Imaging of Mesenchymal Stem Cells in Living Mice Via Silica-Coated Gold Nanorods," ACS Nano 6(7):5920-5930, 2012.
Joplin, A., et al., "Correlated Absorption and Scattering Spectroscopy of Individual Platinum-Decorated Gold Nanorods Reveals Strong Excitation Enhancement in the Nonplasmonic Metal," ACS Nano 11:12346-12357, 2017.
Joplin, A., et al., "Imaging and Spectroscopy of Single Metal Nanostructure Absorption," Langmuir 34:3775-3786, 2017.
Jørgensen, J.T., et al., "Single Particle and PET-Based Platform for Identifying Optimal Plasmonic Nano-Heaters for Photothermal Cancer Therapy," Scientific Reports 6:30076, 2016, 10 pages.
Karabutov, A.A., et al., "Determination of the Optical Characteristics of Turbid Media by the Laser Optoacoustic Method," Quantum Electronics 29(12):1054-1059, 1999.
Karabutov, A.A., et al., "Direct Measurement of the Spatial Distribution of Light Intensity in a Scattering Medium," JETP Letters 70:183-188, Aug. 1999.
Karabutov, A.A., et al., "Time-Resolved Laser Optoacoustic Tomography of Inhomogeneous Media," Applied Physics B 63:545-563, 1996.

(56) References Cited

OTHER PUBLICATIONS

Khokhlova, T.D., et al., "Optoacoustic Imaging of Absorbing Objects in a Turbid Medium: Ultimate Sensitivity and Application to Breast Cancer Diagnostics," Applied Optics 46:262-272, Jan. 2007.

Kim, S.-E., et al., "Near-Infrared Plasmonic Assemblies of Gold Nanoparticles With Multimodal Function for Targeted Cancer Theragnosis," Scientific Reports 7:17327, 2017, 10 pages.

Köker, T., et al., "Cellular Imaging by Targeted Assembly of Hot-Spot SERS and Photoacoustic Nanoprobes Using Split-Fluorescent Protein Scaffolds," Nature Communications 9:607, 2018, 17 pages.

Koman, V.B., et al., "Multiscattering-Enhanced Absorption Spectroscopy," Analytical Chemistry 87(3):1536-1543, 2015.

Laufer, J., et al., "Evaluation of Absorbing Chromophores Used in Tissue Phantoms for Quantitative Photoacoustic Spectroscopy and Imaging," IEEE Journal of Selected Topics in Quantum Electronics 16:600-607, 2010.

Laufer, J., et al., "In Vitro Characterization of Genetically Expressed Absorbing Proteins Using Photoacoustic Spectroscopy," Biomedical Optics Express 4:2477-2490, Nov. 2013.

Lee, K.-S., and M.A. El-Sayed, "Gold and Silver Nanoparticles in Sensing and Imaging: Sensitivity of Plasmon Response to Size, Shape, and Metal Composition," Journal of Physical Chemistry B 110:19220-19225, 2006.

Leiss-Holzinger, E., et al., "Multimodal System for Non-Contact Photoacoustic Imaging, Optical Coherence Tomography, and Mid-Infrared Photoacoustic Spectroscopy," Proceedings of SPIE BiOS 2016, Photons Plus Ultrasound: Imaging and Sensing 2016, Mar. 15, 2016, San Francisco, p. 970810, 9 pages.

Pelivanov, I., et al., "Molecular Fingerprinting of Nanoparticles in Complex Media With Non-Contact Photoacoustics: Beyond the Light Scattering Limit," Scientific Reports 8:14425, Sep. 26, 2018, 19 pages.

Pelivanov, I.M., et al., "Opto-Acoustic Measurement of the Local Light Absorption Coefficient in Turbid Media: 1. Monte-Carlo Simulation of Laser Fluence Distribution at the Beam Axis Beneath the Surface of a Turbid Medium," Quantum Electronics 39(9):830-834 (2009).

Pelivanov, I.M., et al., "Opto-Acoustic Measurement of the Local Light Absorption Coefficient in Turbid Media: 2. On the Possibility of Light Absorption Coefficient Measurement in a Turbid Medium From the Amplitude of the Opto-Acoustic Signal," Quantum Electronics 39(9):835-838 (2009).

Strohm, E.M., et al., "Single Cell Photoacoustic Microscopy: A Review," IEEE Journal of Selected Topics in Quantum Electronics 22(3):6801215, May/Jun. 2016, 15 pages.

Stuart, D.A., et al., "Biological Applications of Localised Surface Plasmonic Phenomenae," IEE Proceedings—Nanobiotechnology 152(1):13-32, Feb. 2005.

Taroni, P., et al., "In-Vivo Absorption and Scattering Spectroscopy of Biological Tissues," Photochemical & Photobiological Sciences 2(2):124-129, Feb. 2003.

Thomas, K.G., et al., "Uniaxial Plasmon Coupling Through Longitudinal Self-Assembly of Gold Nanorods," Journal of Physical Chemistry B 108(35):13066-13068, 2004.

Villanueva, Y., et al., "Measuring Absorption Coefficient of Scattering Liquids Using a Tube Inside an Integrating Sphere," Applied Optics 55(11):3030-3038, Apr. 2016.

Wiegand, J.R., et al., "A UV-VIS Photoacoustic Spectrophotometer," Analytical Chemistry 86(12):6049-6056, 2014.

Wong, T.T.W., et al., Label-Free Automated Three-Dimensional Imaging of Whole Organs by Microtomy-Assisted Photoacoustic Microscopy, Nature Communications 8:1386, 2017, 8 pages.

Xu, M., and L.V. Wang, "Photoacoustic Imaging in Biomedicine," Review of Scientific Instruments 77:041101, 2006, 23 pages.

Yao, J., and L.V. Wang, "Sensitivity of Photoacoustic Microscopy," Photoacoustics 2:87-101, 2014.

Ye, X., et al. "Improved Size-Tunable Synthesis of Monodisperse Gold Nanorods Through the Use of Aromatic Additives," ACS Nano 6(3):2804-2817, 2012.

Yorulmaz, M., et al., "Absorption Spectroscopy of an Individual Fano Cluster," Nano Letters 16:6497-6503, 2016.

Yorulmaz, M., et al., "Single-Particle Absorption Spectroscopy by Photothermal Contrast," Nano Letters 15:3041-3047, 2015.

Zhang, H.F., et al., "Functional Photoacoustic Microscopy for High-Resolution and Noninvasive In Vivo Imaging," Nature Biotechnology 24(7):848-851, Jul. 2006.

Lequin, R.M., "Enzyme Immunoassay (EIA)/Enzyme-Linked Immunosorbent Assay (ELISA)," Clinical Chemistry 51:2415-2418, 2005.

Li, W., and X. Chen, "Gold Nanoparticles for Photoacoustic Imaging," Nanomedicine 10:299-320, 2015.

Lim, W.Q., and Z. Gao, "Plasmonic Nanoparticles in Biomedicine," Nano Today 11:168-188, 2016.

Ling, T., et al., "Fabrication and Characterization of High Q Polymer Micro-Ring Resonator and Its Application as a Sensitive Ultrasonic Detector," Optics Express 19:861-869, Jan. 2011.

Liu, K., et al., "Theoretical Comparison of Optical Properties of Near-Infrared Colloidal Plasmonic Nanoparticles," Scientific Reports 6:34189, 2016, 10 pages.

Liu, X., et al., "Size Dependent Cellular Uptake of Rod-Like Bionanoparticles With Different Aspect Ratios," Scientific Reports 6:24567, 2016, 8 pages.

Lobko, K., et al., "Optoacoustic Determination of Analytical Parameters and Physicochemical Constants in Highly Concentrated Solutions of Chromophores," Talanta 174:206-213, 2017.

Loo, C., et al., "Immunotargeted Nanoshells for Integrated Cancer Imaging and Therapy," Nano Letters 5(4):709-711, 2005.

Lu, B., et al., "Comparison of Methods for Reducing the Effects of Scattering in Spectrophotometry," Applied Spectroscopy 60:1157-1166, 2006.

Lucky, S.S., et al., "Nanoparticles in Photodynamic Therapy," Chemical Reviews 115:1990-2042, 2015.

Luke, G.P., et al., "Silica-Coated Gold Nanoplates as Stable Photoacoustic Contrast Agent for Sentinel Lymph Node Imaging," Nanotechnology 24(45):455101, Nov. 2013, 16 pages. (Author Manuscript provided, PMCID: PMC4000721, available in PMC Nov. 15, 2014, 16 pages.

Mallidi, S., et al., "Molecular Specific Optoacoustic Imaging With Plasmonic Nanoparticles," Optics Express 15(11):6583, May 2007.

Mallidi, S., et al., "Multiwavelength Photoacoustic Imaging and Plasmon Resonance Coupling of Gold Nanoparticles for Selective Detection of Cancer," Nano Letters 9(8):2825-2831, 2009.

Manjavacas, A., et al., "Plasmon-Induced Hot Carriers in Metallic Nanoparticles," ACS Nano 8(8):7630-7638, 2014.

Mann, S.A., et al., "Integrating Sphere Microscopy for Direct Absorption Measurements of Single Nanostructures," ACS Nano 11:1412-1418, 2017.

Mayer, K.M., et al., "A Label-Free Immunoassay Based Upon Localized Surface Plasmon Resonance of Gold Nanorods," ACS Nano 2(4):687-692, 2008.

Morgan, S.P., and M.E. Ridgway, "Polarization Properties of Light Backscattered From a Two Layer Scattering Medium," Optics Express 7(12):395, Dec. 2000, 8 pages.

Mura, S., et al., "Stimuli-Responsive Nanocarriers for Drug Delivery," Nature Materials 12:991-1003, 2013.

Murphy, C.J., et al., "Anisotropic Metal Nanoparticles: Synthesis, Assembly, and Optical Applications," Journal of Physical Chemistry B 109(29):13857-13870, 2005.

Murphy, C.J., et al., "Chemical Sensing and Imaging With Metallic Nanorods," Chemical Communications 5:544-557, 2008.

Murphy, C.J., et al., "Gold Nanoparticles in Biology: Beyond Toxicity to Cellular Imaging," Accounts of Chemical Research 41(12):1721-1730, 2008.

NanoComposix, "Gold Nanoparticles: Optical Properties," © 2019, <http:nanocomposix.com/pages/gold-nanoparticles-optical-properties> [retrieved Sep. 16, 2019], 4 pages.

Near, R., et al., "Extinction vs Absorption: Which Is the Indicator of Plasmonic Field Strength for Silver Nanocubes?" Journal of Physical Chemistry C 116(43):23019-23026, 2012.

(56) References Cited

OTHER PUBLICATIONS

Nikitin, S.M., et al., "Temperature Dependence of the Optoacoustic Transformation Efficiency in Ex Vivo Tissues for Application in Monitoring Thermal Therapies," Journal of Biomedical Optics 17(6):061214, 2012, 10 pages.

Ntziachristos, V., and D. Razansky, "Molecular Imaging by Means of Multispectral Optoacoustic Tomography (MSOT)," Chemical Reviews 110(5):2783-2794, 2010.

Oh, N., and J.-H. Park, "Endocytosis and Exocytosis of Nanoparticles in Mammalian Cells," International Journal of Nanomedicine 9:51-63, 2014.

Owen, T., "Fundamentals of Modern UV-Visible Spectroscopy: A Primer," Agilent Technologies, 2000, 148 pages.

Peer, D., et al., "Nanocarriers as an Emerging Platform for Cancer Therapy," Nature Nanotechnology 2:751-760, Dec. 2007.

Pelivanov, I., et al., "A New Fiber-Optic Non-Contact Compact Laser-Ultrasound Scanner for Fast NDT&E of Aircraft Composites," Journal of Applied Physics 115(11):113105, 2014, 11 pages.

Pelivanov, I., et al., "NDT of Fiber-Reinforced Composites With a New Fiber-Optic Pump-Probe Laser-Ultrasound System," Photoacoustics 2(2):63-74, 2014.

Pelivanov, I.M., et al., "Direct Opto-Acoustic In Vitro Measurement of the Spatial Distribution of Laser Radiation in Biological Media," Quantum Electronics 36(12):1089-1096, 2006.

Pelivanov, I., and M. O'Donnell, "Imaging of Porosity in Fiber-Reinforced Composites With a Fiber-Optic Pump-Probe Laser-Ultrasound System," Composites Part A 79:43-51, 2015.

Pelivanov, I., et al., "A 1 kHz A-Scan Rate Pump-Probe Laser-Ultrasound System for Robust Inspection of Composites," IEEE Transactions on Ultrasonics, Ferroelectrics, and Frequency Control 62(9):1696-1703, Sep. 2015.

Pelivanov, I., et al., "Heat Damage Evaluation in Carbon Fiber-Reinforced Composites With a kHz A-Scan Rate Fiber-Optic Pump-Probe Laser-Ultrasound System," Composites: Part A 84:417-427, 2016.

Pelivanov, I., et al., "High Resolution Imaging of Impacted CFRP Composites With a Fiber-Optic Laser-Ultrasound Scanner," Photoacoustics 4:55-64, 2016.

Petrova, E., et al., "Temperature-Dependent Optoacoustic Response and Transient Through Zero Grüneisen Parameter in Optically Contrasted Media," Photoacoustics 7:36-46, 2017.

Pham, T.H., et al., "Broad Bandwidth Frequency Domain Instrument for Quantitative Tissue Optical Spectroscopy," Review of Scientific Instruments 71(6):2500-2513, Jun. 2000.

Pogue, B.W., and M.S. Patterson, "Frequency-Domain Optical Absorption Spectroscopy of Finite Tissue Volumes Using Diffusion Theory," Physics in Medicine & Biology 39:1157-1180, 1994.

Prost, A., et al., "Photoacoustic Generation by a Gold Nanosphere: From Linear to Nonlinear Thermoelastics In The Long-Pulse Illumination Regime," arXiv preprint arXiv:1501.04871v4, 2015, 42 pages; also in Physics Review B 92:115450, 2015, 16 pages.

Razansky, D., et al., "Volumetric Real-Time Multispectral Optoacoustic Tomography of Biomarkers," Nature Protocols 6(8):1121-1129, 2011.

Rodrigo, J.A., and T. Alieva, "Light-Driven Transport of Plasmonic Nanoparticles on Demand," Scientific Reports 6:33729, 2016, 6 pages.

Rosenthal, A., et al., "Wideband Optical Sensing Using Pulse Interferometry," Optics Express 20:19016-19029, 2012.

Rosi, N., and C.A. Mirkin, "Nanostructures in Biodiagnostics," Chemical Reviews 105:1547-1562, 2005.

Rui, M., et al., "Photoacoustic Microscopy and Spectroscopy of Individual Red Blood Cells," © 2010 Optical Society of America, International Journal of Radiation Oncology • Biology • Physics 10.1364/BIOMED.2010.BSuD93, Apr. 2010, 4 pages.

Shishkin, M.A., et al., "Direct Solubility Determination in Optically Dense Solutions of Highly Soluble Chromophores by the Optoacoustic Technique: Acidity Dependence for Phenol Red," Analytica Chimica Acta 953:57-62, 2017.

Simandoux, O., et al., "Influence of Nanoscale Temperature Rises on Photoacoustic Generation: Discrimination Between Optical Absorbers Based on Thermal Nonlinearity at High Frequency," Photoacoustics 3:20-25, 2015.

Simoni, R.D., et al., "A Classic Instrument: The Beckman DU Spectrophotometer and Its Inventor, Arnold O. Beckman," Journal of Biological Chemistry 278(49):e1, Dec. 2003, 4 pages.

Stockford, I.M., et al., "Reduction of Error in Spectrophotometry of Scattering Media Using Polarization Techniques," Applied Spectroscopy 61(12):1379-1389, 2007.

Stramski, D., and J. Piskozub, "Estimation of Scattering Error in Spectrophotometric Measurements of Light Absorption by Aquatic Particles From Three-Dimensional Radiative Transfer Simulations," Applied Optics 42(18):3634-3646, Jun. 2003.

Karabutov, A., et al., "Opto-Acoustic Measurement of Optical Properties of Turbid Media," Proceedings of SPIE (Society of Photo Optical Instrumentation Engineers) 4749:288-298, May 2002.

Mie, G., "Beiträge zur Optik trüber Medien, Speziell Kolloidaler Metallösungen," [translation: "Contributions on the Optics of Turbid Media, Particularly Colloidal metal Solutions]," Annalen der Physik, Series IV, 25:377-445, 1908.

\* cited by examiner

NON-CONTACT PHOTOACOUSTIC SPECTROPHOTOMETRY INSENSITIVE TO LIGHT SCATTERING

CROSS-REFERENCE TO RELATED APPLICATION

This application claims the benefit of Provisional Application No. 62/649,142 filed on Mar. 28, 2018, the disclosure of which is hereby incorporate by reference.

STATEMENT OF GOVERNMENT LICENSE RIGHTS

This invention was made with Government support under grant EB-016034 awarded by the National Institutes of Health. The Government has certain rights in the invention.

BACKGROUND

For over 150 years, scientists have used optical extinction/absorption spectroscopy to quantify the molecular constituents of complex media. Specifically, ultraviolet through visible light (UV-VIS) spectrophotometry has been a standard laboratory tool since the 1940s for chemical analysis in disciplines ranging from materials science to physical chemistry to molecular biology.

Every molecule, solution, and structure such as a living cell has a unique optical absorption spectrum representing a molecular fingerprint. However, quantitative fingerprinting is a challenge for most biological substances where scattering dominates absorption and conventional UV-VIS spectrophotometry gives very inaccurate results. This challenge is amplified when molecular agents, especially plasmonic nanoparticles (NPs) are used to target cells. Beneficial and/or deleterious effects are ultimately determined by interactions at cellular and subcellular levels. Their effectiveness can often be predicted if their "journey" within a cell and their interactions with cellular constituents can be tracked. Because the resonance of plasmonic NPs is very sensitive to shape and surrounding environment, any alterations in a NP's original absorption can provide feedback on its state within the cell and, in turn, can help monitor NP-based procedures such as targeted drug delivery, contrast-enhanced therapy, molecular sensing, and gene engineering.

In UV-VIS spectrophotometry, the portion of light that does not reach the detector is assumed to be absorbed inside the medium. However, UV-VIS extinction spectra are determined not only by absorption but also by scattering. Differences in refractive indexes of different structures within a complex medium partially reflect light from internal interfaces, thus creating a scattering component. Optical scatterers do not absorb photons, but rather redistribute them, changing their propagation path. Consequently, a considerable fraction of transmitted light does not reach the detector and a conventional spectrophotometry registers incorrect (higher) absorptivity for such media.

Light absorption is an intrinsic property of molecules whereas scattering is an extrinsic property determined by a medium's detailed structure and morphology. For simple samples such as pure liquids, absorption may dominate scatter, such that the measured UV-VIS extinction spectra provide detailed information about molecular constituents. For more physically complex samples, such as biological tissue, blood, stimulus-responsive materials, suspensions of nanoparticles, polymer films, colloidal and thin film semiconductors, plasmonic nanostructures, metamaterials and others with significant scattering over a broad wavelength range, however, UV-VIS extinction spectra are hard to interpret and provide few details about molecular constituents because the extinction spectra are influenced by both absorption and scatter. Indeed, this is similar to the simple case of a coin that can be easily seen inside a glass of water, but cannot be detected inside the same glass filled with milk even though milk has absorption properties very similar to that of water.

The problem of extracting light absorption information from conventional UV-VIS extinction spectra for media exhibiting a significant scattering background was reported years ago, and some pure optical methods have been developed to minimize its effects. However, these techniques cannot be easily incorporated into conventional spectrophotometers or multi-spectral devices due to their complexity.

For example, to measure absorption and scattering in a medium independently, an integrating sphere surrounding the measurement chamber can be used. This approach is appropriate for both homogeneous samples and nanometer size targets, but is very sensitive to sample size, sample position within the sphere, and the type of chamber. Calibration is required for all wavelengths and full quantitation requires a detailed scattering model inside the sample. In general, it is very difficult to implement for routine measurements in the typical well chambers used by conventional UV-VIS spectrophotometers.

Techniques have been developed to measure the optical properties of biological tissues. The most efficient technique analyzes the propagation time and extension of an ultrashort probe laser pulse due to light scattering in the medium, which if detected, can separate medium absorbance from scattering. However, it requires pico- or femto-second lasers tunable over a wide wavelength range (unavailable on the market) and complicated time-resolved detection techniques. Thus, this approach is not well-suited to routine spectrophotometry measurements. In addition, it is not universal, requiring thick, strongly scattering samples and diffusive light propagation to obtain quantitative results.

The situation may be even more complicated. A substance might scatter light itself or combine absorption and scattering properties (like most nanoparticles) and, in addition, be within a scattering environment (such as most biological tissues). Obtaining real molecular signatures (or true absorption spectra) becomes extremely complicated for this situation. Indeed, it is extremely difficult to distinguish light absorption from scattering, i.e., find a real molecular fingerprint within a very complex scattering background, which is essential for many applications based on nano- and micro-structures.

Gold nanoparticles (GNPs) are booming in many areas, such as hot electron generation, photovoltaics and biomedicine, due to their nearly unique optical properties and the ease in conjugating them with important biomolecules. Depending on size, shape, degree of aggregation, and local environment, GNPs exhibit different colors reflecting their plasmonic resonance when irradiated with light of an appropriate wavelength. Plasmonic resonance underlies the intense absorption and scattering of light and is the basis for many biological sensing and imaging applications.

Molecularly targeted precise drug delivery, immune and nano assays, gene editing, stem cell surgery and advanced methods of therapy have all leveraged GNPs and together are significantly impacting all of biomedicine. Measured NP spectra can drive multi-wavelength schemes to remove background signals (i.e., signals not resulting from the agent) in photoacoustic molecular images. Furthermore, for therapy applications (photodynamic or photothermal), UV-VIS spectra are needed to predict the thermal dose at a specific wavelength. Unfortunately, conventional UV-VIS measurements do not accurately predict the absorption spectra needed for these and other applications because plasmonic coupling induces wavelength-dependent light scattering in addition to absorption, as clearly shown in theoretical work as a function of GNP material, shape, size and distance between them. Unfortunately, such theoretical results cannot generally be used to separate absorption from scattering of measured UV-VIS spectra because synthesized GNPs are not ideal.

Recently, photothermal spectroscopy methods have been developed to measure pure absorption spectra of NPs down to the scale of single particles. Photothermal spectroscopy uses light-to-heat conversion to deflect a probe beam. Because only the absorbed part of light leads to heating, beam deflection is mostly determined by the light absorption coefficient of the medium. However, the method does not take into account changes in laser fluence due to light scattering and thus is limited to very low concentrations, though excellent results have been obtained for individual nano absorbers. Photothermal spectroscopy also fails when a strong scattering background surrounds NPs (or any other absorbers).

An instrument to measure the true absorption properties of GNPs independent of their scattering and the scattering properties of the background would help improve the efficacy of many methods using GNPs and accelerate their translation. Indeed, most current methods identifying GNP state, composition, and environment are based on light scattering, which depends on many factors, including not only GNP concentration, but also the micro and macro properties of the background and measurement conditions.

Optical instruments can probe physical systems even to the level of individual molecules. However, scattering limits molecular fingerprinting within a complex compound. A new, non-contact photoacoustic-based method is disclosed that can almost completely remove the influence of light scattering on absorption measurements in heterogeneous highly scattering solutions and, furthermore, can separate the intrinsic absorption of nanoscale objects from their scattering. In particular, measurement of pure absorption spectra for solutions containing plasmonic NPs, for example gold nanorods (GNRs) as an example of a plasmonic agent, is disclosed. These spectra differ from the (extinction) spectra measured with conventional UV-VIS spectrophotometry.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A non-contact photoacoustic spectrophotometry system for measuring an absorption spectrum of a material disposed in a container includes a tunable time-modulated light source configured to produce a light beam configured to generate a photoacoustic signal in the material. A non-contact detector with a second light source is focused onto an outer surface of the container and a receiver configured to receive light reflected from the outer surface and to transmit the received light to an interferometer. The interferometer produces an interference signal from the received light and transmits the interference signal to a processor, and the processor is configured to calculate a corresponding absorption value.

In an embodiment the tunable time-modulated light source comprises a pulsed laser source configured to produce a pulse duration in the range from 1 nanosecond to 500 microseconds.

In an embodiment the tunable time-modulated light source comprises an intensity-modulated continuous wave laser source, or a collection of intensity-modulated continuous wave laser sources, with a modulation frequency greater than 10 kHz.

In an embodiment the broadband continuous wave device comprises a superluminescent diode.

In an embodiment the interferometer is a Sagnac interferometer, for example, a double differential fiber-optic Sagnac interferometer.

In an embodiment the interference signal is directly proportional to an acoustic pressure in the material.

In an embodiment the tunable time-modulated light source is configured to produce a light beam with wavelengths through the range of 355 nm to 2,000 nm.

In an embodiment the outer surface of the container further comprises a reflective coating that is reflective at the wavelength of the second light source.

In an embodiment the system further includes an XY translation stage in signal communication with the processor and configured to support the container. In some embodiments an optical scanner scans both light sources over the material disposed in the container while (or between) the XY translation stage moves the container, for example to provide access to different portions of the container.

In an embodiment the container comprises a well plate having a plurality of wells. In some embodiments the plurality of wells include a reflective coating that is reflective at the wavelength of the second light source.

A method for constructing an absorption spectrum for a material includes placing the material into a container having a container wall, using a tunable time-modulated light source, sequentially generating a plurality of light beams at different wavelengths that are directed into the material to produce a photoacoustic response in the material, and for each of the plurality of light beams: (i) monitoring the container wall with a non-contact detector comprising a second light source focusing a continuous wave beam on the container wall and a receiver configured to receive light from the continuous wave beam that has reflected from the container wall; (ii) transmitting the reflected light to an interferometer configured to produce an interference signal from the reflected light that is directly proportional to an acoustic pressure in the material; and (iii) transmitting the interference signals to a controller and calculating a corresponding absorbance coefficient for the interference signal for the corresponding wavelength. The absorbance coefficients and corresponding wavelengths comprise an absorbance spectrum for the material.

In an embodiment the time-modulated light source is configured to produce a laser pulse with a pulse duration in the range from 1 nanosecond to 500 microseconds.

In an embodiment the tunable time-modulated light source comprises an intensity-modulated continuous wave laser source, or a plurality of intensity-modulated continuous wave laser sources, with a modulation frequency greater than 10 kHz.

In an embodiment the second light source comprises a broadband continuous wave device.

In an embodiment the broadband continuous wave device comprises a superluminescent diode.

In an embodiment the tunable time-modulated light source is configured to produce a light beam with wavelengths through the range of 355 nm through 2,000 nm.

In an embodiment the interferometer is a Sagnac interferometer.

In an embodiment the Sagnac interferometer is a double differential fiber-optic Sagnac interferometer.

In an embodiment the container comprises a well plate having a plurality of wells.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
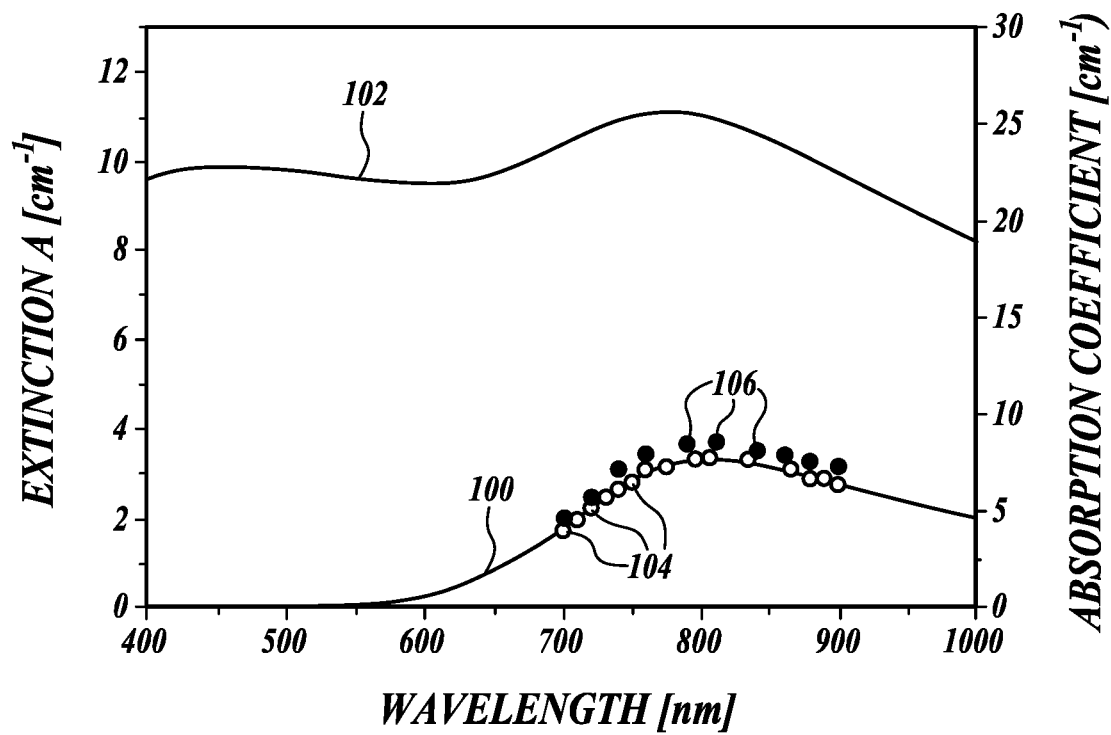
FIG. 1 shows measured spectra of optical extinction with conventional UV-VIS for a $CuSO_4 \cdot 5H_2O$ solution, with and without a scattering suspension of polystyrene microspheres in the solution, and also shows measured absorption coefficient of the corresponding absorption spectrums using a method in accordance with the present invention.

A system and method is disclosed that exploits the photoacoustic effect, in which a portion of time-modulated light energy absorbed in a target is converted into acoustic transients, e.g., ultrasound signals, to deliver molecular fingerprint information outside of the target where the information can be detected. The photoacoustic (PA) signal amplitude is proportional to the amount of heat converted into mechanical motion and, thus, proportional to the light absorption coefficient.

In particular, a system and method is disclosed for non-contact, photoacoustic, scatter-insensitive spectrophotometry. The method provides true molecular fingerprinting, i.e., measuring true light absorption spectrum suitable for use in analyzing complex highly scattering samples, for example fluid samples containing nanoparticles and/or biological cells.

Conventional photoacoustic spectroscopy uses ultrasound transients (PA signals) excited with intensity-modulated light and detected with ultrasound transducers. Different ultrasound transducers can be used, including conventional piezoelectric and all-optical ultrasound transducers. However, conventional optical receivers for PA imaging require direct coupling with the medium under study, thus limiting their integration into ultraviolet through visible light (UV-VIS) spectrophotometry devices.

The extinction A (typically used in radiometry) is a dimensionless parameter defined as $A = \log(I/I_0)$. The extinction A, measured in a pure absorptive, non-scattering solution is related to the light absorption coefficient defined from the Bouguer-Lambert-Beer law: $\mu_a = \ln(I/I_0)/d$, (d is the medium thickness) for a 1 cm thick cuvette as $A = \mu_a/\ln(10)$.

When the medium scatters light, the Bouguer-Lambert-Beer law no longer applies and the relationship between A and $\mu_a$ is not determined. Scattering redistributes light over the volume of the sample whereas absorption determines attenuation along one direction. Thus, the extinction, A, measured in different cuvettes and with different spectrophotometers may differ, whereas $\mu_a$ always defines the absorbed part of light.

Scattering can greatly modify the UV-VIS spectrum depending on a number of physical parameters such as the relative mechanical densities of the components, size of the scatterers, and their concentrations. Furthermore, the resulting spectrum can change with sample thickness, i.e., the distance between the source and detector, probe beam diameter, and aperture of the detector. Thus, even if scattering within a solution is known, it is often extremely difficult to extract the intrinsic molecular absorption from extinction measurements. This means that molecular decomposition (e.g., measuring a spectrum of a complicated sample containing multiple constituents, each with its own molecular signature, and calculating relative concentrations of the constituents) is nearly impossible using UV-VIS spectra obtained in samples with significant optical scattering over the measured wavelength range.

Even relatively simple samples can produce UV-VIS extinction spectra that are strongly influenced by scattering. FIG. 1 shows (in solid lines) a measured extinction spectra 100 (left axis) of an aqueous solution of cupric sulfate ($CuSO_4 \cdot 5H_2O$) obtained with conventional UV-VIS spectrophotometry, and a measured extinction spectrum 102 of a highly scattering cupric sulfate solution containing 1 micron diameter polystyrene microspheres in concentration of 1.5 g/L. The light scattering from the microspheres greatly obscures the molecular fingerprint of the cupric sulfate from the light absorption spectrum.

As is known in the art, an optical beam nearly meeting narrow beam conditions eliminates the dependence of laser fluence on optical properties, thus making the PA signal linearly dependent on optical absorption. Narrow beam conditions apply when the diameter of the excitation beam is less than the transport mean free path of a photon in the medium. For example, the PA signal amplitude is nearly independent of light scattering for a 0.5 mm diameter beam in media where the scattering coefficient ranges from 0-20 $cm^{-1}$.

Absorption measurements obtained using the non-contact photoacoustic method satisfying narrow beam conditions disclosed herein produce an absorption spectrum 104 (open circles, right axis) for the aqueous solution of cupric sulfate that is essentially identical to the UV-VIS extinction spectrum 100 obtained using the conventional method. However, the non-contact photoacoustic method disclosed herein applied to the highly scattering mixture of cupric acid solution with the polystyrene microspheres produces an absorption spectrum 106 (solid circles) that is only slightly higher than the absorption obtained without scattering microspheres. The measured absorption spectrum using the present method is not significantly changed by scatterers immersed in the solution.

Figure 2:
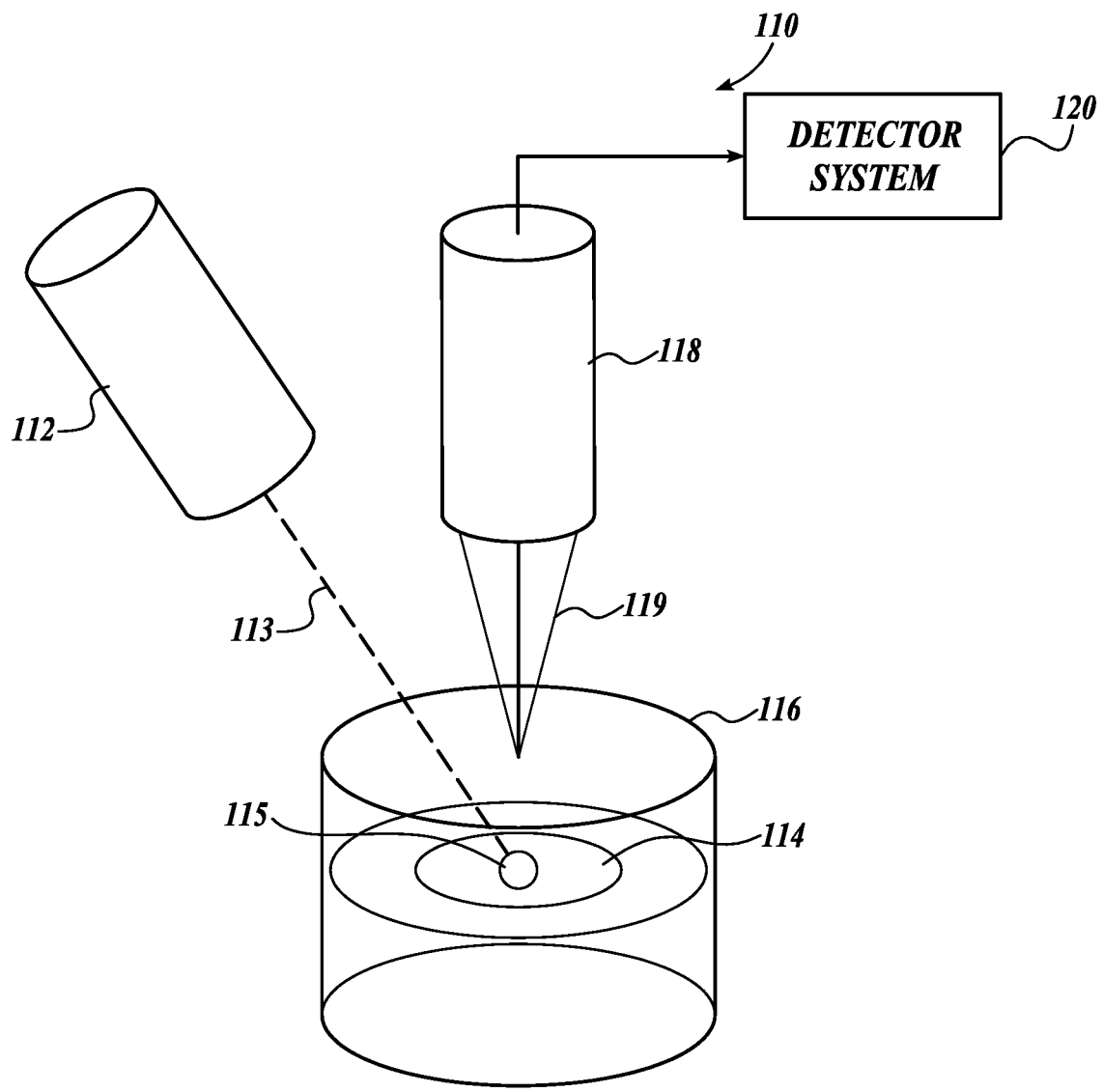
FIG. 2 shows schematically an exemplary system for non-contact photoacoustic spectrophotometry in accordance with the present invention.

A simplified schematic illustrating an exemplary system 110 for non-contact photoacoustic spectrophotometry in accordance with the present invention is shown in FIG. 2. In this system 110 a time-modulated light source, for example a probe laser 112, is directed towards a material 115 (sometimes referred to as a sample) in a small diaphragm 114 positioned between two quartz plates 116. In one embodiment the probe laser 112 is a diode pumped tunable laser configured to generate nanosecond laser pulses 113 tunable in a range of 700-900 nm. In other embodiments the probe laser is an intensity-modulated continuous wave laser, or collection of intensity-modulated continuous wave lasers, tunable in a range of 700-900 nm with modulation frequency greater than 10 kHz. In other embodiments the probe laser 112 is tunable over the entire range of the UV-VIS spectrum. Photoacoustically generated ultrasound transients (PA signals) are produced in the material 115 by the laser pulses 113.

PA signals are detected using a second light source, for example, a continuous wave laser/receiver head system 118 that monitors a surface of the quartz plate 116. The quartz plate 116 in this embodiment has a reflective coating (not shown) tuned to the wavelength of the continuous wave laser/receiver system 118. The reflected beam 119 is transmitted to an ultrasensitive detector system 120 to analyze the PA signals, as discussed below.

Figure 3:
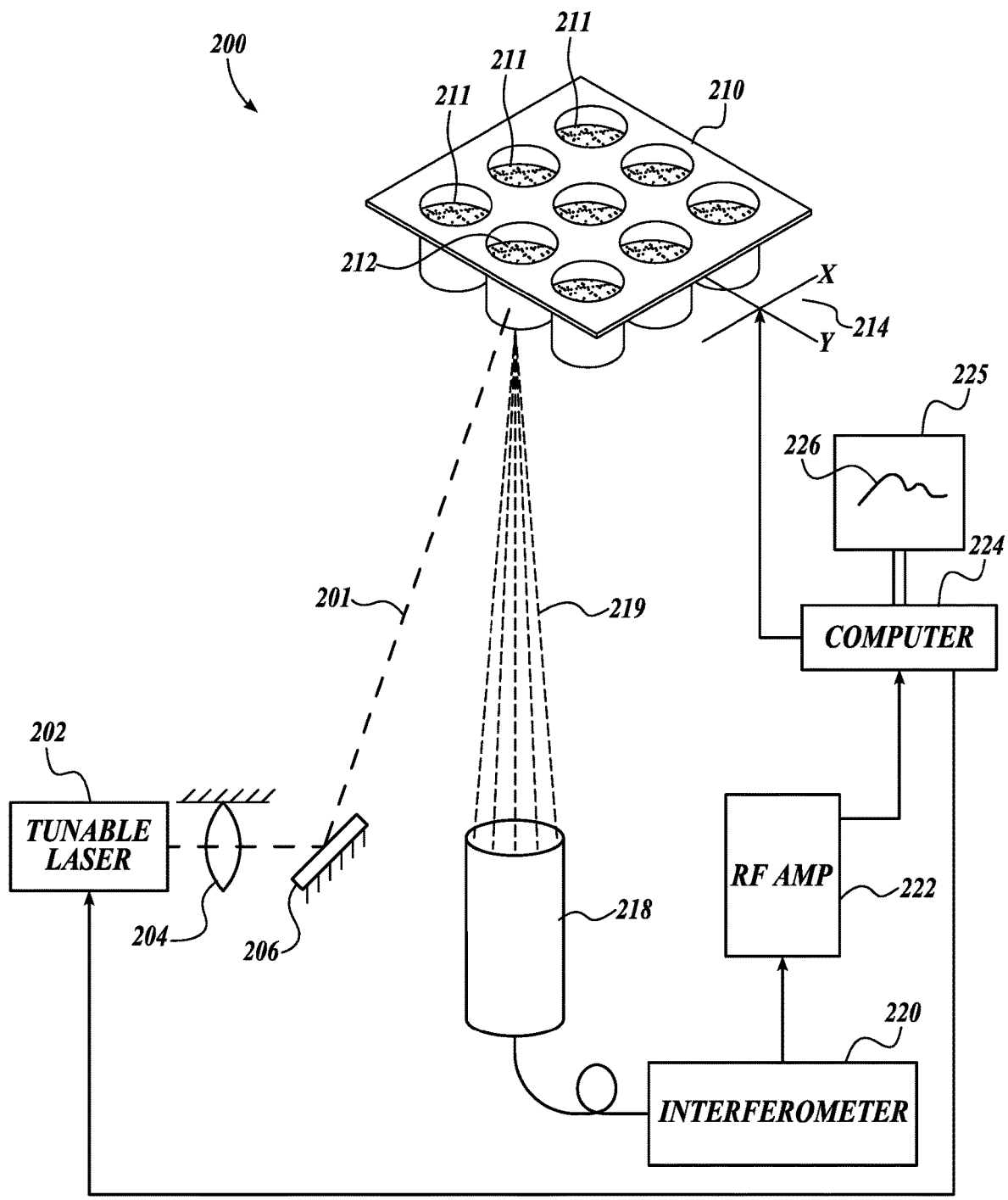
FIG. 3 illustrates another embodiment of a non-contact photoacoustic system in accordance with the present invention.

Refer now to FIG. 3, which illustrates another embodiment of a non-contact photoacoustic spectrophotometer system 200 in accordance with the present invention. The PA spectrophotometer system 200 includes a time-modulated light source, for example, a tunable pulsed laser 202 configured to produce beam pulses 201. In other embodiments the time-modulated light source may be an intensity-modulated continuous wave laser, or collection of intensity-modulated continuous wave lasers, with modulation frequency greater than 10 kHz. In an exemplary embodiment the tunable laser 202 is a diode-pumped nanosecond laser. The system further includes a focusing system 204 (illustrated as a lens) and/or mirror 206 configured to precisely direct and focus pulses 201 from the tunable laser 202 into a material 212 in a container 210. The container 210 contains one or more materials (or samples) 212 to be examined. In this embodiment the container 210 is a well plate, for example a microplate, sometimes referred to as a microwell plate, having a plurality of cuvettes, vials, or wells 211. For example, some common well plates may have 96, 384, or 1,536, or more separate wells 211. The wells 211 are transparent to the beam pulses 201, such that a material 212 in the well 211 may be selectively probed by the beam pulses 201 to generate a photoacoustic response in the material 212. In other embodiments the probe beam 201 may be configured to enter the material 212 from a side or top, for example from above the well 211, which may be open or provided with a transparent cover.

The laser pulses 201 are directed to a well 211 by a broadband mirror 206, which may be fixed or configured to be controllably pivoted, for example, to direct the probe beam 201 to different wells 211. The laser pulse energy at the surface of the material may be controlled with a set of neutral-density filters (not shown) and the beam diameter is controlled to satisfy narrow beam conditions. The probe laser 202 in this embodiment is controllable to vary the pulse repetition frequency (PRF) from single shot to 4 kHz, reaching the maximum mean power in a range of about 1 W at 1 kHz PRF at 800 nm wavelength. The laser 202 is programmable to switch wavelengths within one ms in any desired sequence. In some embodiments the PRF may be between 1 Hz and 100 kHz.

In another embodiment the pulsed laser 202 is operable over a broad tunable range, for example, to cover the entire UV-VIS wavelength range, or within a range extending from ultraviolet to the infrared. In a current embodiment the pulsed laser 202 is tunable to controllably emit coherent beam pulses at least through the 355-2,000 nm wavelength range. Other wavelength ranges are contemplated, as will be apparent to persons of skill in the art.

To probe the material 212 in a particular well 211, and/or to analyze material 212 in successive wells 211, the well plate 210 is supported by an XY translation stage 214 (indicated schematically), for example, a translation stage 214 with a linear speed of up to 100 mm/s (80 mm/s used). In addition to physical scanning of the well plate 210, optical beams may be scanned together over the material 212 in the wells 211 in addition to physically scanning the well plate 210 with the XY translation stage. Other systems for controlling the position of the target well 211 are known in the art, and contemplated herein.

In an example embodiment the translation of the well plate 210 for each well 211 is positionally synchronized with pulse laser 202 firing, providing a trigger signal to the laser 202 for every 0.5 mm of translation. In a particular test one hundred positions, and therefore laser pulses, were used for one XY-scan of a sample material 212 in a single cuvette 211. Scans were then repeated fifty (50) times resulting in five thousand (5,000) laser pulses for stepped wavelengths in the selected range. Spectroscopic measurements were performed with a wavelength step of 10 nm, resulting in 21 points for each measured spectrum.

Due to light absorption in the material 212, the laser pulses 201 are partially absorbed. The absorbed laser energy is converted to transient heating of the material 212 which results in excitation of ultrasound transients.

A continuous wave laser/receiver head system 218 focuses a laser onto the targeted well 211, and receives a corresponding reflected wave 219 to detect the PA signals. The reflected waves are analyzed with a fiber-optic interferometer 220. An exemplary Sagnac interferometer is disclosed in U.S. Patent Application Publication No. 2017/0115110, to Pelivanov et al., which is hereby incorporated by reference in its entirety.

The interferometer 220 in a current embodiment is a double differential fiber-optic Sagnac interferometer. The Sagnac interferometer 220 is different from other types of two-beam interferometers that split the original beam in space, and wherein one of the split beams is the reference and the other is directed to the material 212. There are several problems with conventional interferometer designs that make it difficult to achieve high sensitivity and robust operation in real, noisy (non-laboratory) conditions. For example, conventional designs require a highly coherent source very sensitive to sample surface quality, and (more importantly) any background noise applied to the reference arm affects the interference and can strongly reduce the SNR (signal-to-noise ratio).

The fiber-optic Sagnac interferometer 220 splits the probe beam in time by polarizations. One beam is delayed in the fiber delay line. This delay determines the detection bandwidth. Both beams are reflected from the same point of the material. On the way back, the propagation paths of the beams are switched with a quarter wave plate located in the detection head of the interferometer. When mixed together the beams arrive at exactly the same time and, thus, create nearly 100% interference. Additional noise rejection is reached using a balanced photodetector. The interference signal is directly proportional to acoustic pressure, not to the displacement as for conventional designs. The Sagnac interferometer does not have a reference arm and thus does not need any stabilization and feedback, which makes it relatively insensitive to environmental noise. A very compact, low power, low coherent superluminescent diode is the source for the interferometer.

The detected signals were amplified 222, and digitized and processed on a standard computer 224. In other embodiments a custom controller may be provided. An output device is provided, for example a monitor 225 (shown in FIG. 3 displaying a measured absorption spectrum 226).

The detected PA signal amplitude is proportional to light absorption coefficient under narrow beam conditions, as discussed above. To obtain the absolute value of light absorption, the system is calibrated. The calibration procedure includes measuring the PA signal amplitude in a medium with known absorption, for example, a solution of $CuSO_4*5H_2O$ at different concentrations. For one concentration, the UV-VIS extinction spectrum was measured with a conventional spectrophotometer.

Although FIG. 3 shows the tunable pulsed laser 202 and the continuous wave laser/receiver head system 218 as separated components, in a currently preferred embodiment these systems are combined in a single assembly with optical elements such that beam from the continuous wave laser system 218 and the pulsed beam from the tunable laser 202 are aligned to approach the target well 211 along the same optical path, and the optical beams can be scanned together over the material in a well 211, while the XY translation stage physically moves the well plate 210, for example to provide the scanning laser with access to other portions of the material in the well 211, or to the material in other wells 211.

A new non-contact PA-based method of optical absorption spectrophotometry is described that almost completely removes the influence of light scattering on absorption measurements in heterogeneous highly scattering solutions and, furthermore, separates the intrinsic absorption of nanoscale objects from their scattering. Because the proposed method operates in reflection mode, it is not limited by the concentration of absorbers and scatterers and, therefore, can probe optically dense solutions.

Numerous studies have proposed using nanoparticles targeted to specific cell types for different medical applications, such as sensing, drug delivery, imaging, and therapy. Plasmonic coupling of metallic particles can change the spectrum and sometimes provides highly efficient light absorption and scattering at a specific wavelength, but at the same time, plasmonic properties depend greatly on their local environment as well as their composition.

The properties of GNP can help greatly improve biochemical assays such as sandwich-type enzyme-linked immunosorbent assay (ELISA). It is the most widely used immunoassay to detect a specific antigen within a complex mixture. Although very effective at detecting small amounts of analyte, conventional ELISA relies on either fluorescence or a colorimetric change to determine antigen concentrations, requiring purified, cell-free specimens and multiple rinsing steps to minimize optical interference and obtain a pure signal. ELISA's dependence on enzymatic activity for detection is another problem, due to its variability with temperature, denaturation, pH, and other factors. GNPs can potentially solve these issues, but antibody conjugated particles exposed to an analyte tend to cluster. Clustering alters both the scattering characteristics and absorption spectra of intracellular nanoparticles, where these changes depend greatly on the details of clustering mechanisms within specific cell types. Since optical scattering is a three-dimensional effect strongly dependent on scatterer concentration, true quantitation is challenging. Similar conclusions apply to other scattering-based modalities for sensing and imaging. Even relatively new absorption-based PA imaging may give confusing results when spectral changes of GNP were not quantitatively determined before imaging. Establishing the true absorption spectrum is also extremely important for GNP-based therapies (photothermal and photodynamic).

Moreover, a NP's original absorption spectrum can dramatically change when internalized by cells. Because the plasmon resonance is very sensitive to geometry of the resonance oscillator and its surrounding environment, any alterations in a NP's absorption spectrum may provide precise feedback on its state within a cell. A simple absorption-based, label-free technique has many advantages over scattering-based methods.

Scattering can lead to serious mistakes in evaluating light absorption with conventional UV-VIS spectrophotometry. Although the scattering component of the spectrum can be estimated using numerical simulations for both a single NP and aqueous solutions, it is extremely difficult for practical cases where NPs interact with living objects such as cells. Numerical calculation of the absorption must account for particles' interaction with each other, e.g. clustering, and on their interaction with cells. Because these processes depend on numerous parameters, accurate physical modeling is a very complicated, multi-parameter problem. Direct measurement of the absorption spectrum is much simpler and potentially more accurate.

The technique presented here can be applied in several areas. PA-based absorption spectroscopy may be a good tool to probe any scattering medium, especially biological substances, cell cultures, and tissue samples. Sensing, imaging and therapy (such as photodynamic or photothermal ones) applications can only be optimized by accurately measuring a contrast agent's properties in situ to define the best conditions (e.g., wavelength) for optical delivery. In another application, the disclosed system and method may be used in flow cytometry, for example to identify cell types. In yet another application, the disclosed invention may be used to identify cell types in biopsy samples for point-of-care pathology. In other examples, the system and method may provide spatially localized measurements of the optical absorption spectrum of complex mediums, for example to image or identify the spatial distribution of molecular characteristics within the medium.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one," or "one or more." Unless otherwise required by context, singular terms used herein shall include pluralities and plural terms shall include the singular.

Unless the context clearly requires otherwise, throughout the description and the claims, the words "comprise," "comprising," and the like, are to be construed in an inclusive sense as opposed to an exclusive or exhaustive sense; that is to say, in the sense of "including, but not limited to." Words using the singular or plural number also include the plural and singular number, respectively. The words "herein," "above," and "below," and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

While illustrative embodiments have been illustrated and described, it will be appreciated that various changes can be made therein without departing from the spirit and scope of the invention.

The embodiments of the invention in which an exclusive property or privilege is claimed are defined as follows:

1. A non-contact photoacoustic spectrophotometry system for measuring an absorption spectrum of a material disposed in a container, the system comprising:
   a tunable time-modulated light source configured to produce a light beam and direct the light beam into the material such that the light beam generates a photoacoustic signal in the material;
   a non-contact detector comprising a second light source focused onto an outer surface of the container and a receiver configured to receive light reflected from the outer surface and to transmit the received light to an interferometer;
   wherein the interferometer produces an interference signal from the received light and transmits the interference signal to a processor; and
   wherein the processor is configured to calculate a corresponding absorption value.

2. The non-contact photoacoustic spectrophotometry system of claim 1, wherein the tunable time-modulated light source comprises a pulsed laser source configured to produce a pulse duration ranging from 1 nanosecond to 100 microseconds.

3. The non-contact photoacoustic spectrophotometry system of claim 1, wherein the second light source comprises a broadband continuous wave device.

4. The non-contact photoacoustic spectrophotometry system of claim 3, wherein the broadband continuous wave device comprises a superluminescent diode.

5. The non-contact photoacoustic spectrophotometry system of claim 1, wherein the interferometer is a Sagnac interferometer.

6. The non-contact photoacoustic spectrophotometry system of claim 5, wherein the Sagnac interferometer comprises a double differential fiber-optic Sagnac interferometer.

7. The non-contact photoacoustic spectrophotometry system of claim 1, wherein the interference signal is directly proportional to an acoustic pressure in the material.

8. The non-contact photoacoustic spectrophotometry system of claim 1, wherein the tunable time-modulated light source is configured to produce a light beam with wavelengths through the range of 355 nm to 2,000 nm.

9. The non-contact photoacoustic spectrophotometry system of claim 1, wherein the outer surface of the container further comprises a reflective coating that is reflective at the wavelength of the second light source.

10. The non-contact photoacoustic spectrophotometry system of claim 1, further comprising an XY-translation stage in signal communication with the processor and configured to support the container.

11. The non-contact photoacoustic spectrophotometry system of claim 1, wherein the container comprises a well plate having a plurality of wells.

12. The non-contact photoacoustic spectrophotometry system of claim 11, wherein each of the plurality of wells include a reflective coating that is reflective at the wavelength of the second light source.

13. A method for constructing an absorption spectrum for a material, the method comprising:
   placing the material into a container having a container wall;
   using a tunable time-modulated light source, sequentially generating a plurality of light beams at different wavelengths that are directed into the material to produce a photoacoustic response in the material, and for each of the plurality of light beams:
      i. monitoring the container wall with a non-contact detector comprising a second light source focusing a continuous wave beam on the container wall and a receiver configured to receive light from the continuous wave beam that has reflected from the container wall;
      ii. transmitting the reflected light to an interferometer configured to produce an interference signal from the reflected light that is directly proportional to an acoustic pressure in the material; and
      iii. transmitting the interference signals to a controller and calculating a corresponding absorbance coefficient for the interference signal for the corresponding wavelength;
   wherein the absorbance coefficients and corresponding wavelengths comprise an absorbance spectrum for the material.

14. The method of claim 13, wherein the time-modulated light source is configured to produce a laser pulse with a pulse duration ranging from 1 nanosecond to 500 microseconds.

15. The method of claim 13, wherein the second light source comprises a broadband continuous wave device.

16. The method of claim 15, wherein the broadband continuous wave device comprises a superluminescent diode.

17. The method of claim 13, wherein the tunable time-modulated light source is configured to produce a light beam with wavelengths through the range of 355 nm through 2,000 nm.

18. The method of claim 13, wherein the interferometer is a Sagnac interferometer.

19. The method of claim 18, wherein the Sagnac interferometer is a double differential fiber-optic Sagnac interferometer.

20. The method of claim 13, wherein the container comprises a well plate having a plurality of wells.

* * * * *